United States Patent
Reimchen (10) Patent No.: US 12,352,322 B2
(45) Date of Patent: Jul. 8, 2025

(54) FREEWHEELING MECHANISM HAVING AN INTERLOCKING CONNECTION BETWEEN THE SHEET METAL CAGE AND THE FREEWHEELING MEMBER BY MEANS OF A COUPLING DISK

(71) Applicant: Schaeffler Technologies AG & Co. KG, Herzogenaurach (DE)

(72) Inventor: Alexander Reimchen, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/294,581

(22) PCT Filed: Apr. 20, 2022

(86) PCT No.: PCT/DE2022/100299
§ 371 (c)(1),
(2) Date: Feb. 2, 2024

(87) PCT Pub. No.: WO2023/011677
PCT Pub. Date: Feb. 9, 2023

(65) Prior Publication Data
US 2024/0344569 A1    Oct. 17, 2024

(30) Foreign Application Priority Data
Aug. 6, 2021    (DE) ...................... 10 2021 120 521.2

(51) Int. Cl.
*F16D 41/067*    (2006.01)

(52) U.S. Cl.
CPC ................................. *F16D 41/067* (2013.01)

(58) Field of Classification Search
CPC ...................................................... F16D 41/067
See application file for complete search history.

(56) References Cited

U.S. PATENT DOCUMENTS

| 4,187,937 A | * | 2/1980 | Kitchin | ................. F16D 41/067 192/45.011 |
| 2010/0038202 A1 | * | 2/2010 | Doerrie | ................. F16D 41/067 192/115 |

(Continued)

FOREIGN PATENT DOCUMENTS

| CN | 202628880 U | 12/2012 |
| CN | 207261506 U | 4/2018 |

(Continued)

*Primary Examiner* — Farhana Pervin (57) ABSTRACT

A freewheeling mechanism includes a freewheeling member with a clamping structure, clamping parts arranged on the clamping structure, and a sheet metal cage for spacing the clamping parts in a direction of revolution. The sheet metal cage is placed on the freewheeling member and includes a base body with a support portion extending radially outward and a coupling rim on a first axial side. The coupling rim includes a coupling disk fixed coaxially on the base body and adjoining the support portion. The coupling disk includes a coupling portion with a coupling structure for interlocking coupling to the clamping structure such that the sheet metal cage is held on the freewheeling member for conjoint rotation. The support portion and the coupling disk have a same external diameter with assembly recesses provided at their respective outer circumferences, and the assembly recesses lie over one another in an assembled state.

9 Claims, 6 Drawing Sheets

(56) References Cited

U.S. PATENT DOCUMENTS

| | | | |
|---|---|---|---|
| 2013/0299294 A1 | 11/2013 | Doerrie et al. | |
| 2016/0010705 A1* | 1/2016 | Mori | F16D 41/064 |
| | | | 192/45.006 |
| 2017/0037913 A1* | 2/2017 | Fujiwara | F16D 41/067 |
| 2017/0254373 A1* | 9/2017 | Hodge | F16D 41/067 |
| 2018/0031056 A1* | 2/2018 | Krenn | F16D 41/067 |

FOREIGN PATENT DOCUMENTS

| | | | | |
|---|---|---|---|---|
| DE | 102008037972 A1 | | 2/2010 | |
| DE | 102010052922 A1 | | 5/2012 | |
| DE | 102011005245 A1 | | 9/2012 | |
| DE | 102011082215 A1 | * | 3/2013 | ........... F16D 41/067 |
| JP | 2014105821 A | | 6/2014 | |
| JP | 2014173666 A | | 9/2014 | |
| JP | 2016130586 A | | 7/2016 | |
| WO | 2023011678 A1 | | 2/2023 | |

* cited by examiner

FREEWHEELING MECHANISM HAVING AN INTERLOCKING CONNECTION BETWEEN THE SHEET METAL CAGE AND THE FREEWHEELING MEMBER BY MEANS OF A COUPLING DISK

CROSS-REFERENCE TO RELATED APPLICATIONS

This application is the United States National Phase of PCT Appln. No. PCT/DE2022/100299 filed Apr. 20, 2022, which claims priority to German Application No. DE102021120521.2 filed Aug. 6, 2021, the entire disclosures of which are incorporated by reference herein.

TECHNICAL FIELD

The present disclosure relates to a freewheeling mechanism.

BACKGROUND

Freewheeling mechanisms are used, for example, as one-way clutches and often consist of outer rings or inner rings with wedging ramps, sometimes plastics cages, pressure springs and rollers as clamping parts. They transmit torque in one rotational direction and are designed as space-saving components.

Document DE 10 2010 052 922 A1, for example, discloses a freewheeling mechanism cage comprising a base body with two annular, substantially radially extending edge disks, which are connected to one another by a plurality of circumferentially adjacent, axially extending connecting struts, whereby interspaces are formed for receiving clamping parts. The inner ring of the freewheeling mechanism is provided with a clamping structure. Rollers with pins at their end faces are movably guided in elongate holes in the edge disks and biased against the clamping structure by means of wire springs arranged at the sides of the edge disks.

DE 10 2011 005 245 A1 reveals a freewheeling mechanism with an internal star, the clamping parts of which are guided in a cage. The cage is cup-shaped and has a coupling structure cut out of the bottom of the cup which is adapted to the ramp profile of the freewheeling mechanism ring and is in interlocking connection therewith.

A generic freewheeling mechanism is known from DE 10 2008 037 972 A1. The freewheeling mechanism is provided with a freewheeling member embodied as an outer ring and having a clamping structure. Clamping parts are arranged on the clamping structure and guided in a sheet metal cage. The sheet metal cage is provided on one axial side with a coupling rim with a coupling structure. The coupling structure is used for interlocking coupling to the clamping structure, such that the sheet metal cage is held on the freewheeling member for conjoint rotation therewith in the direction of revolution. The coupling structure is formed on a coupling disk, which is fixed coaxially to a base body of the sheet metal cage. For this purpose, the coupling rim is provided with a support portion. The support portion, like the coupling structure, extends radially outward. The coupling disk adjoins the support portion axially, such that the coupling rim has a double material thickness. Due to the interlocking coupling of the coupling structure and the clamping structure, the sheet metal cage is connected to the outer ring for conjoint rotation therewith in the direction of revolution.

SUMMARY

The present disclosure provides a freewheeling mechanism which is designed for ease of manufacture.

According to the disclosure, the support portion and the coupling disk have the same external diameter. In addition, according to the disclosure, assembly recesses are provided at the outer circumference, which lie over one another in the assembled state and are designed as passages open at the edge.

The freewheeling mechanism is designed, for example, as a one-way clutch or as an overrunning clutch. The freewheeling mechanism can be used, for example, as an indexing mechanism, backstop, overrunning clutch, etc. The freewheeling mechanism may assume an overrunning function and/or a holding function. The freewheeling mechanism can be used, for example, in a motor vehicle transmission.

The clamping structure has a plurality of wedging ramps running in the direction of revolution relative to the rotation axis. For example, the clamping structure may have more than 3, e.g., more than 6 or more than 10 such wedging ramps.

The freewheeling mechanism has a plurality of clamping parts, and the clamping parts may be designed as rollers, e.g., as cylindrical rollers. The freewheeling mechanism defines a rotation axis, and the rotational axes of the rollers are aligned parallel to the rotation axis. One clamping part may be assigned to each wedging ramp in the freewheeling mechanism.

The freewheeling mechanism has a sheet metal cage for spacing the clamping parts in the direction of revolution. For example, the sheet metal cage provides spring support for the clamping parts in the direction of revolution. For this purpose, the sheet metal cage can serve as a support for spring devices which are arranged in the sheet metal cage and which apply a spring force to the clamping parts in the direction of revolution. The freewheeling mechanism may include the spring devices, for example.

The freewheeling member may have a positive clamping structure. The sheet metal cage, e.g., the coupling rim, may have a coupling structure and/or profiling which is at least partially or completely complementary and/or oppositely formed and/or negative and which fits into the positive clamping structure. The clamping structure of the freewheeling member and/or the coupling structure of the sheet metal cage and/or of the coupling rim may extend in the axial direction parallel to the rotation axis and/or may have a constant cross section in the axial direction relative to the rotation axis. In this embodiment, the sheet metal cage can be easily pushed onto the freewheeling member. At least the negative coupling structure and/or profiling may be designed to be non-rotationally symmetrical and/or deviates from a constant diameter. For example, the negative coupling structure and/or profiling is designed as a wavy and/or contoured edge.

In an example embodiment, a contact area is formed between the coupling rim and the outer circumferential surface of the freewheeling member, e.g., of the clamping structure, and the coupling rim and the freewheeling member make interlocking contact in the contact area. The contact area extends in the direction of revolution about the rotation axis over at least 50%, e.g., over at least 80% or over at least 95% of the outer circumferential length of the freewheeling member in the circumferential direction. The coupling rim may make at least 50%, e.g., at least 80% or at least 95% contact with the wedging ramps in the direction of revolution. The contact area can be formed continuously in the direction of revolution, but it can also be provided that the contact area is broken down into a large number of individual areas. The high level of overlap in the direction of revolution creates a large connection area between the sheet metal cage and the freewheeling member, such that the freewheeling mechanism is particularly loadable.

The contact area may extend in the axial direction over at least 0.5 mm, e.g., over at least 1 mm or over at least 1.5 mm.

As already mentioned above, for the purposes of the disclosure it is proposed that the freewheeling member be configured as an inner part. In this case, the clamping structure is arranged on the outer circumference of the inner part. The inner part can be designed as an inner ring or as a shaft portion, for example of a solid shaft or a hollow shaft. The freewheeling mechanism may be configured as an interior star freewheeling mechanism. The coupling structure is accordingly formed on the inner circumference of the coupling portion. The coupling portion of the coupling rim thus extends radially inward in order to form the interlocking connection in the direction of revolution in the contact area between the sheet metal cage and the freewheeling member. The arrangement of the coupling structure on the sheet metal cage makes it possible to implement the freewheeling mechanism in a manufacturing-friendly manner.

The sheet metal cage may be designed in two parts. The coupling disk is designed, for example, as a flat coupling disk. For example, the coupling disk takes the form of a stamped part. The coupling disk is placed axially onto the base body. The coupling disk may be permanently and/or firmly connected to the base body. The connection can be designed to be force-locking, materially bonded and/or interlocking. For example, the connection can be produced by shaping. Alternatively, the connection is formed by bonding, such that the base body and the coupling disk are permanently connected to one another without tolerance. It is provided that the coupling disk includes the coupling portion with the coupling structure. The coupling structure may be arranged at the inner circumference of the coupling disk, e.g., in such a way that the latter is configured non-rotationally symmetrically at the inner circumference.

The coupling disk with the coupling portion and the support portion in each case may extend in a radial plane relative to the rotation axis. The support portion and the coupling disk with the coupling portion lie directly against one another or even in contact with one another, such that the coupling rim has a double material thickness due to the coupling disk with the coupling portion and the support portion. This configuration, on the one hand, improves ease of manufacture and, on the other hand, increases the stability and/or structural rigidity of the sheet metal cage.

In a further development, the sheet metal cage and/or the base body may have a neutral rim on the other axial side, i.e., on the side that lies opposite the coupling rim, and the neutral rim extends radially outward. The neutral rim may be formed of a single layer. The base body has a U-profile on one half side in longitudinal section, and one upright leg is formed by the neutral rim and the other upright leg is formed by the support portion as part of the coupling rim. The associated axial side of the sheet metal cage is supported and reinforced by the neutral rim. Overall, the design as a U-profile exhibits very high inherent stability and is also straightforward to manufacture in engineering terms.

In an example embodiment, the inner circumference of the neutral rim is circular and/or uncoupled relative to the clamping structure and/or to the freewheeling member in the direction of revolution. The sheet metal cage is therefore driven only by the coupling portion of the coupling rim and/or the coupling disk; the neutral rim, on the other hand, is uncoupled relative to the freewheeling member in the direction of revolution. With this embodiment, manufacturing costs can be reduced since the design with the coupling structure is provided inexpensively on just one axial side. The free internal diameter of the neutral rim may be so narrowly dimensioned that the sheet metal cage can be supported via the neutral rim in the radial direction on the freewheeling member, e.g., on the clamping structure.

In an example implementation, the sheet metal cage and/or the base body has a plurality of web portions, and the clamping parts are arranged between the web portions. The web portions serve, for example, to guide the clamping parts in the direction of revolution. The web portions may include holding portions for holding the spring devices. The web portions are formed in one piece in the base body. These may be made from a common base material piece like the base body. The web portions define a free internal diameter, and the coupling portion with the coupling structure projects into the free internal diameter and/or the neutral rim is radially inwardly delimited by the free internal diameter. A free internal diameter, which corresponds, for example, to the maximum external diameter of the freewheeling member, is thus determined by the neutral rim and the web portions. The coupling portion with the coupling structure projects radially inward into the free internal diameter. This makes it possible for the web portions and/or the neutral rim to rest on the clamping structure and for the coupling structure to engage in an interlocking manner in the clamping structure.

For example, starting from the web portions and/or from the free internal diameter, the coupling rim extends radially outward at least in part or wholly within the double material thickness.

The base body may be made in one piece from a common piece of material. The coupling disk can be made from the same material or as a separate component from a different material, e.g., sheet steel. The piece of material may take the form of a steel sheet. The base body may take the form of a formed part. It may be designed as a formed part manufactured without cutting, e.g., a deep-drawn part.

The sheet metal cage may be pushed onto the freewheeling member in the axial direction, such that the coupling structure engages in an interlocking manner in the clamping structure in the direction of revolution and the neutral rim rests with the inner circumference in contact with the clamping structure. The clamping structure may extend further in the axial direction than the axial extent of the sheet metal cage, such that it cannot accidentally slip off the clamping structure.

The holding portions of the base body may be made from the common base material of the base body, and they may be firstly separated, e.g., punched, and then bent over such that they can constitute a base or bearing for the spring devices.

Optionally, the freewheeling mechanism has an outer ring or an outer ring portion with a cylindrical raceway for the clamping parts.

BRIEF DESCRIPTION OF THE DRAWINGS

Further features, advantages and effects of the disclosure are revealed by the following description of an exemplary embodiment and the attached figures, in which:

FIG. 5 a, b show schematic longitudinal sections through the sheet metal cage of the previous figures.

DETAILED DESCRIPTION

Figure 1:
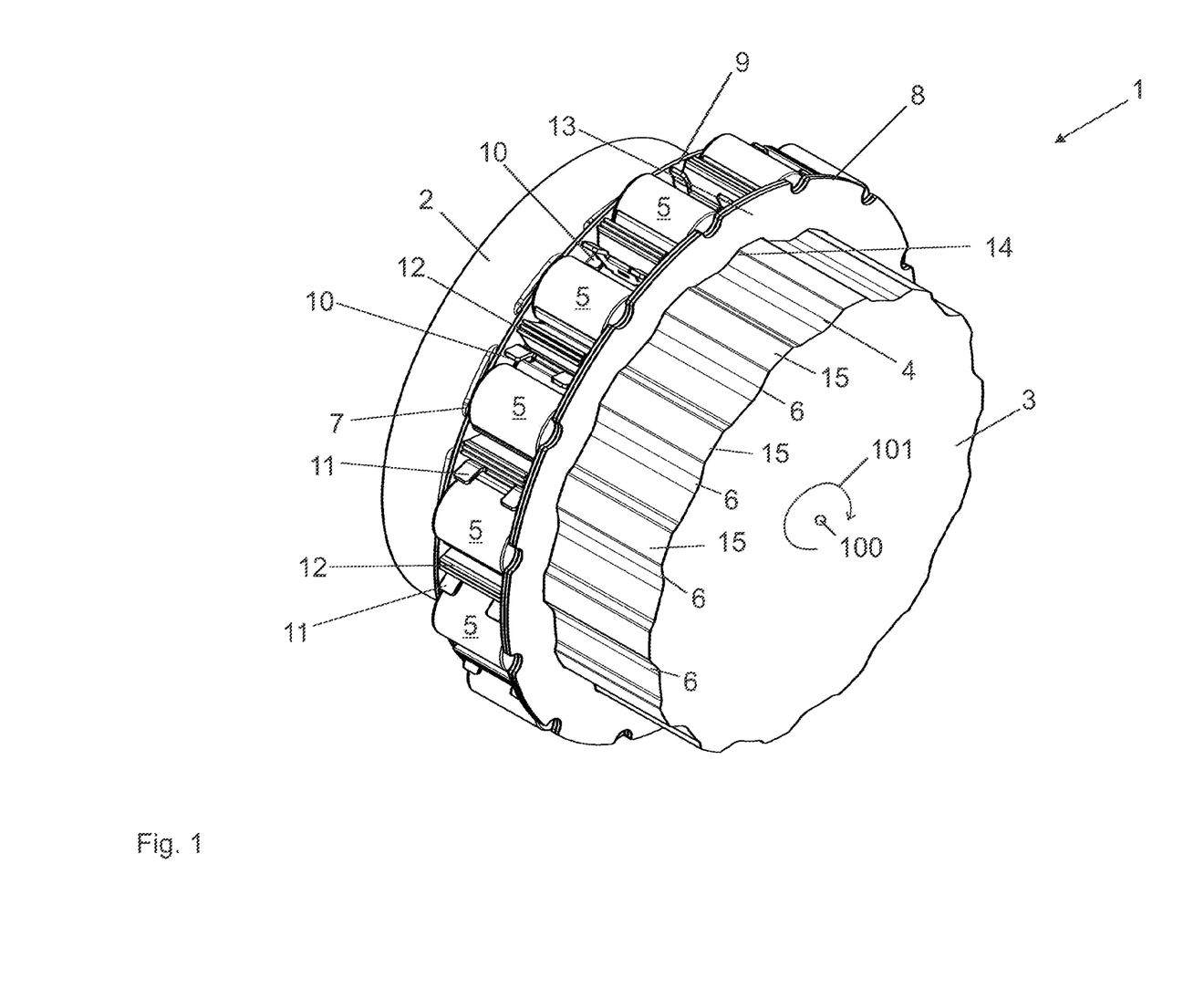
FIG. 1 shows a schematic, three-dimensional representation of a freewheeling mechanism as an exemplary embodiment.

FIG. 1 shows a schematic, three-dimensional representation of a freewheeling mechanism 1 as an exemplary embodiment. The freewheeling mechanism 1 is formed at an intermediate portion or at an end portion of a shaft 2. The freewheeling mechanism 1 has a freewheeling member 3, and the freewheeling member 3 is formed by a shaft portion. In alternative exemplary embodiments, the freewheeling member 3 can also be designed as an inner ring. In this exemplary embodiment, the freewheeling member 3 is designed as an inner part. A clamping structure 4 is installed on the freewheeling member 3. The clamping structure 4 can, for example, be molded in; alternatively, the clamping structure 4 is introduced separately into the freewheeling member 3. In other exemplary embodiments, the clamping structure 4 can also be formed on an attachment of the shaft 2 or the freewheeling member 3. The freewheeling mechanism 1 defines a rotation axis 100.

The freewheeling mechanism 1 has a plurality of clamping parts 5, and the clamping parts 5 are designed as cylindrical rollers. The clamping parts 5 rest on the clamping structure 4 and can be moved thereon in a direction of revolution 101. Viewed more closely, the clamping structure 4 has a plurality of, in particular rising, wedging ramps 6 running in the direction of revolution 101, and the wedging ramps 6 form raceways for the clamping parts 5. In the direction of revolution 101, the wedging ramps 6, together with a cylindrical raceway of an outer ring (not shown), reduce the radial installation space for the clamping parts 5, such that they can assume a clamping position. The clamping structure 4 and/or the wedging ramps 6 extend with a constant cross-sectional profile on the freewheeling member 3. The clamping structure 6 forms positive profiling of the freewheeling member 3 revolving around the rotation axis 101.

The freewheeling mechanism 1 has a sheet metal cage 7 for spacing the clamping parts 5 in the direction of revolution 101. The sheet metal cage 7 is placed on the freewheeling member 3, in particular pushed axially thereon. On one axial side the sheet metal cage 7 has a coupling rim 8, while on the other side the sheet metal cage 7 has a neutral rim 9. The coupling rim 8 and the neutral rim 9 extend outward in the radial direction and run in a radial plane relative to the rotation axis 101. The clamping parts 5 are arranged between the coupling rim 8 and the neutral rim 9. Furthermore, the sheet metal cage 7 has a plurality of web portions 10, and the web portions 10 extend between the coupling rim 8 and the neutral rim 9.

The web portions 10 are adjoined by holding portions 11, in particular designed as lugs, and the holding portions 11 are bent radially outward and aligned approximately in the radial direction. Arranged on the holding portions 11 are spring devices 12, which are designed as compression springs which act tangentially in the direction of revolution. The spring devices 12 are arranged in the direction of revolution 100 between the clamping parts 5 and the holding portions 11, such that the clamping parts 5 run up the wedging ramps 6 against the spring force.

The sheet metal cage 7 has a coupling portion 13 on the coupling rim 8, and the coupling portion 13 has a coupling structure 14 at the inner circumference. The coupling structure 14 serves in interlocking coupling to the clamping structure 4 in the direction of revolution, such that the sheet metal cage 7 is connected to the freewheeling member 3 for conjoint rotation therewith in the direction of revolution. While the clamping structure 4 has positive profiling, the coupling structure 14 has negative profiling, which fits into the positive profiling. For example, a contact area is formed or at least co-formed by the wedging ramps 6 and the coupling portion 12. The coupling portion 12 and the freewheeling member 3 can be embodied in such a way that a force-locking connection and/or a press fit results between the two components in the area of the coupling structure 14 or the clamping structure 14.

Figure 2:
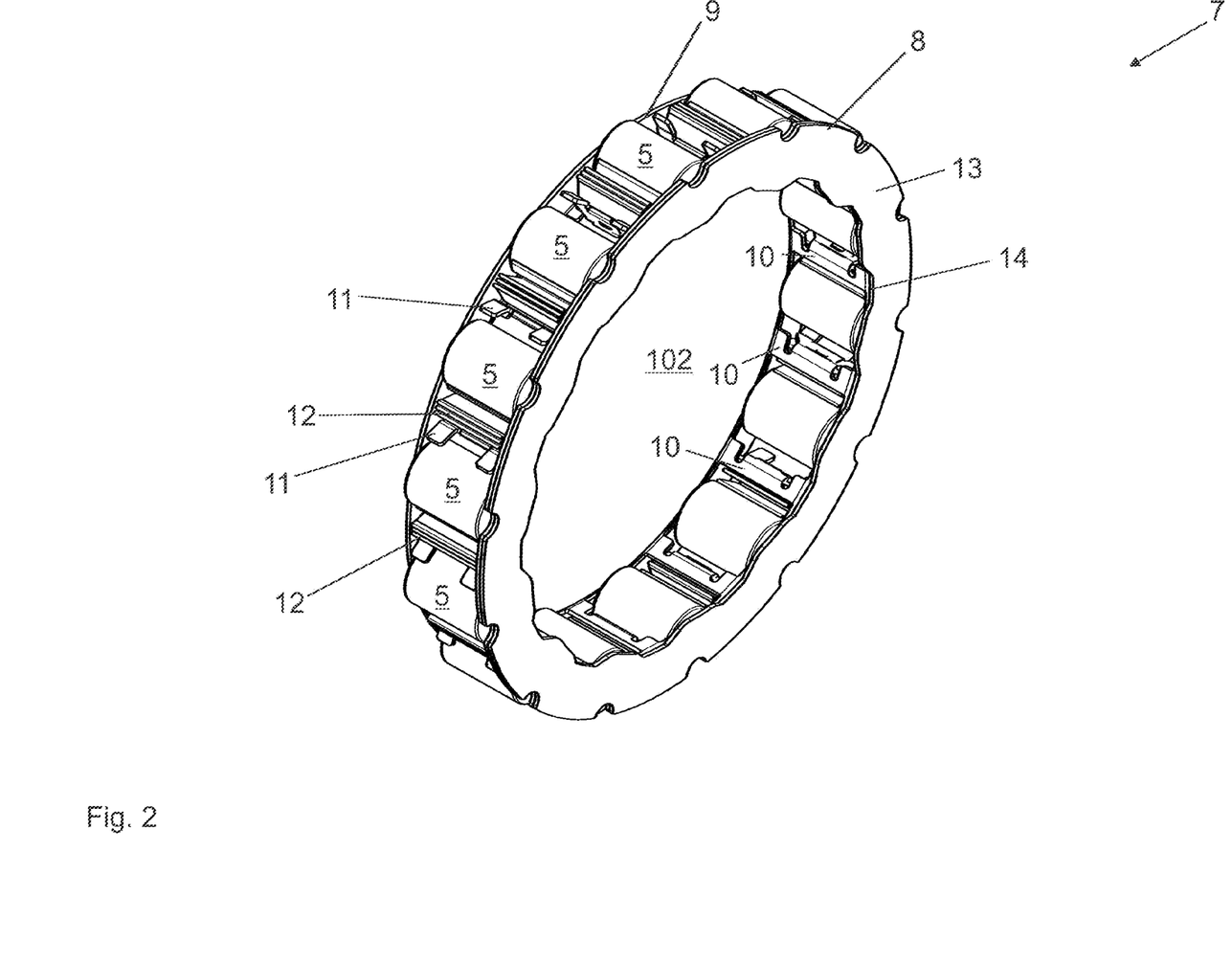
FIG. 2 shows a schematic, three-dimensional representation of a sheet metal cage of the freewheeling mechanism in FIG. 1 with inserted clamping parts.

FIG. 2 is a schematic, three-dimensional representation of the sheet metal cage 7 with inserted clamping parts 5 and mounted spring devices 12. From this illustration it can be seen that the web areas 10 and the neutral rim 9 together define a uniform, free internal diameter 102, and the coupling portion 13 with the coupling structure 14 projects into the free internal diameter 102. In a similar way, the clamping parts 5 also project into the free diameter 102. The web portions 10 can, for example, rest on tangential surfaces 15 of the clamping structure 4 (FIG. 1). The neutral rim 9 can, for example, rest on the clamping structure 4 at least in places. It is then possible for the web portions 10 and/or the inner circumference of the neutral rim 9 to rest on the freewheeling member 3 with a press fit and/or in a force-locking manner, so as to prevent axial displacement of the sheet metal cage 7 relative to the freewheeling member 3.

Figure 3:
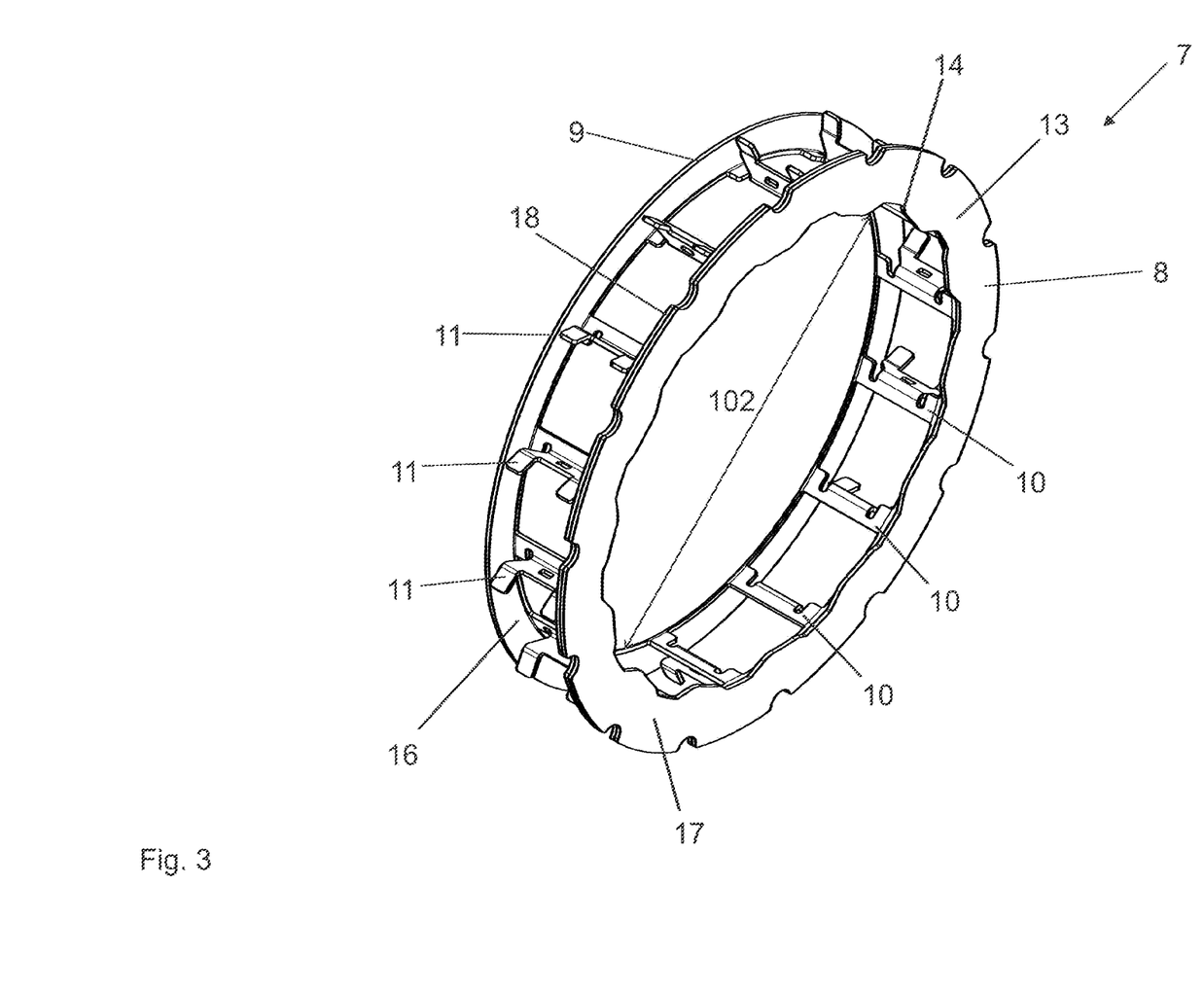
FIG. 3 shows a schematic, three-dimensional representation of the sheet metal cage of the freewheeling mechanism on its own.

FIG. 3 shows the sheet metal cage 7, and it can be seen even in this representation that the sheet metal cage 7 has a double material thickness at the coupling rim 8.

Figure 4:
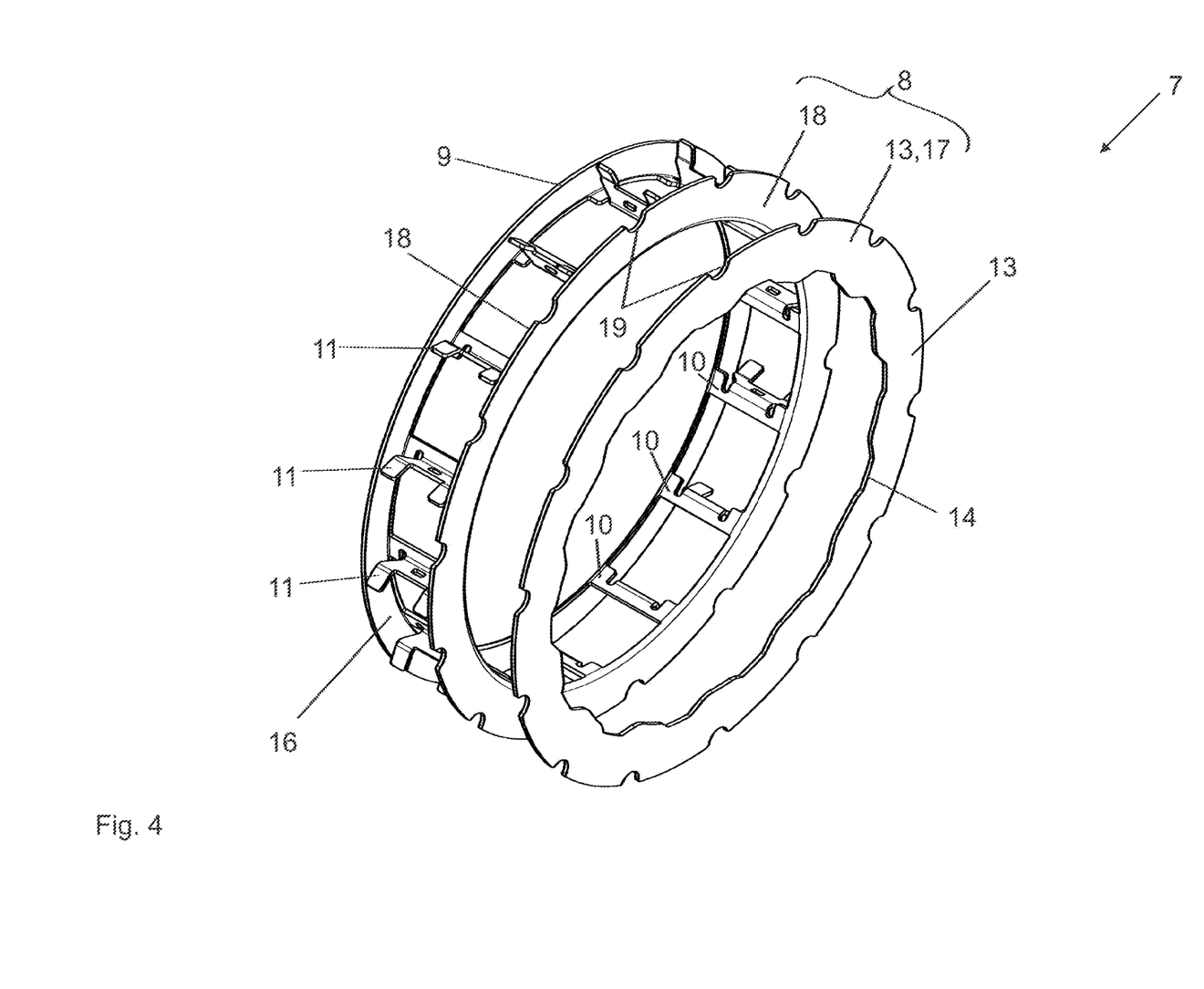
FIG. 4 shows a schematic, three-dimensional representation of the sheet metal cage of FIG. 3 in an exploded view.
Figure 5A:
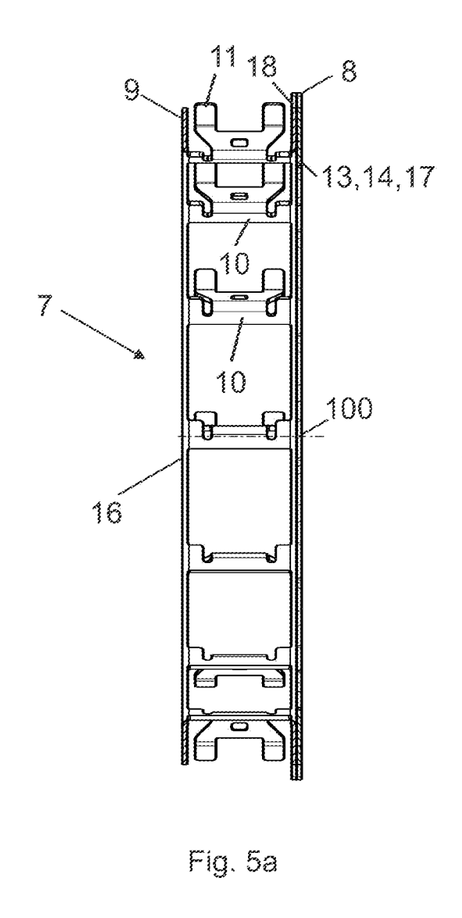
Figure 5B:
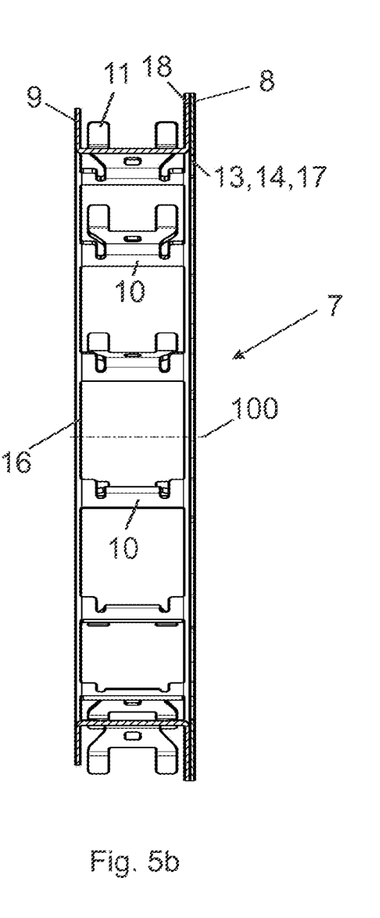

However, this can be seen better in FIGS. 4 and 5 a, b, which respectively show an exploded representation of the sheet metal cage 7 and a longitudinal section through the sheet metal cage 7. These illustrations show that the sheet metal cage 7 is designed in two parts and has a base body 16 and a coupling disk 17, and the coupling disk 17 is fixed coaxially to the base body 16. The coupling disk 17 forms the coupling portion 13 and bears the coupling structure 14. The coupling disk 17 is made in particular from sheet steel and takes the form of a stamped part.

From the illustrations it can be seen that the neutral rim 9 is designed as a collar or as a radial flange, which lies in a radial plane relative to the rotation axis 101 and, starting from the web portions 10, extends exclusively radially outward.

The coupling rim 8, on the other hand, has a support portion 18, which adjoins the web portions 10, lies in a radial plane relative to the rotation axis 101 and runs radially outward. Parallel and immediately adjacent to the support portion 18, the coupling rim 8 has the coupling disk 17 with the coupling portion 13, which also extends in a radial plane relative to the rotation axis 101 and projects with the coupling structure 14 into the area of the free internal diameter 102.

The neutral rim 9 and the support portion 18, together with the web portions 10 and the holding portions 11, form the base body 16. In this exemplary embodiment, the support portion 18 and the coupling disk 17 have the same external diameter, and assembly recesses 19 (FIG. 4) are provided at the outer circumference which lie over one another in the assembled state and are designed as passages open at the edge. The assembly recesses 19 ensure that the coupling disk 17 and the support portion 18 and thus the base body 16 are always assembled in the same angular position to one another.

Figure 6:
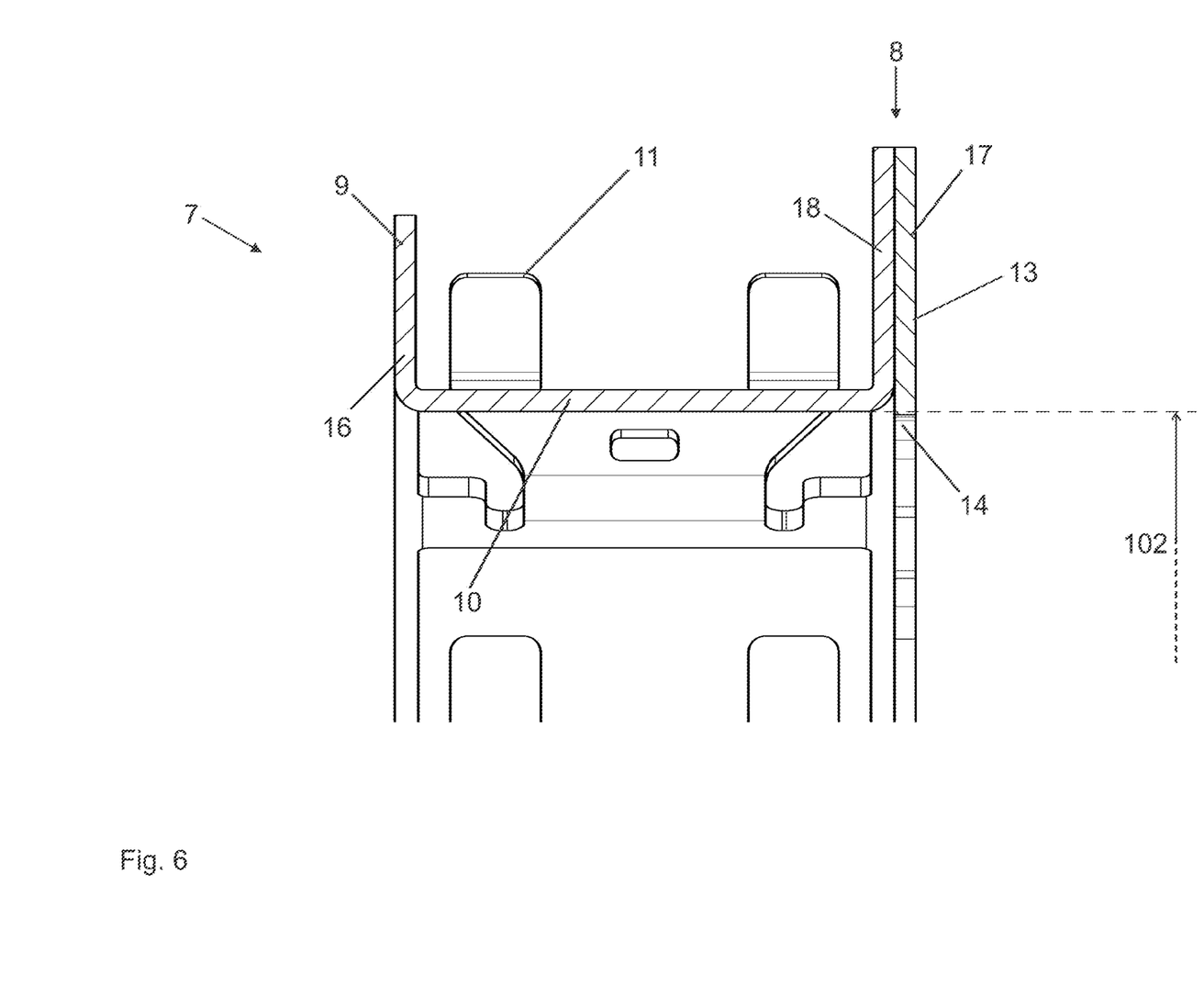
FIG. 6 shows a schematic detail enlargement of the sheet metal cage of the previous figures.

FIG. 6 shows a detail from FIG. 5 a, b. The coupling rim 8 and/or the support portion 18 and the neutral rim 9 are shown arranged parallel to one another, such that they form a U-profile. The web portions 10, which connect the neutral rim 9 and the support portion 18 together in one piece in the base body 16, are again visible. Furthermore, the holding portions 11 can be seen, which through bending project into the free internal diameter at least in places. As can be seen from the illustration, the coupling structure 14 replicates the ramps 6 in terms of contour, such that the interlocking connection is created.

The base body 16 is made from a single piece of material by means of a process sequence of forming and cutting from a common piece of material, in this case a steel sheet. In particular, the base body 16 is manufactured by cold forming. For example, either the neutral rim 9 or the support portion 18 can be formed as a flange portion during deep drawing. The material used is a steel material, as very high temperatures are likely to occur in the vehicle sector.

REFERENCE NUMERALS

1 Freewheeling mechanism
2 Shaft
3 Freewheeling member
4 Clamping structure
5 Clamping part
6 Wedging ramps
7 Sheet metal cage
8 Coupling rim
9 Neutral rim
10 Web portions
11 Holding portions
12 Spring devices
13 Coupling portion
14 Coupling structure
15 Tangential surfaces
16 Base body
17 Coupling disk
18 Support portion
19 Assembly recesses
100 Rotation axis
101 Direction of revolution
102 Free internal diameter

The invention claimed is:

1. A freewheeling mechanism comprising:
a freewheeling member comprising a clamping structure,
a plurality of clamping parts arranged on the clamping structure, and
a sheet metal cage for spacing the clamping parts in a direction of revolution, the sheet metal cage provided, on an axial side, with a coupling rim having a coupling structure for interlocking coupling to the clamping structure, such that the sheet metal cage is held on the freewheeling member for conjoint rotation therewith in the direction of revolution, and, on the other axial side, with a neutral rim wherein:
the sheet metal cage comprises a base body and a coupling disk, the coupling disk comprising a coupling portion with the coupling structure, and the coupling disk is fixed coaxially on the base body,
the base body comprises a support portion, wherein the support portion extends radially outward and the coupling disk adjoins the support portion, such that the coupling rim has a double material thickness,
the freewheeling member is designed as an inner part and the sheet metal cage is placed on the freewheeling member, and the coupling structure here is formed on an inner circumference of the coupling portion,
the support portion and the coupling disk have a same external diameter, wherein assembly recesses are provided at an outer circumference which lie over one another in an assembled state and are designed as passages open at an edge, and
the sheet metal cage is pushed onto the freewheeling member, such that the coupling structure engages in an interlocking manner in the clamping structure in the direction of revolution and the neutral rim rests with the inner circumference in contact with the clamping structure.

2. The freewheeling mechanism according to claim 1, wherein the neutral rim extends radially outward, such that in longitudinal section the base body forms a U-profile on one half side with the neutral rim and the support portion.

3. The freewheeling mechanism according to claim 2, wherein the inner circumference of the neutral rim is circular or uncoupled relative to the clamping structure in the direction of revolution.

4. The freewheeling mechanism according to claim 1, wherein the sheet metal cage or the base body has a plurality of web portions, wherein the clamping parts are arranged between the web portions, wherein the web portions define a free internal diameter, wherein the coupling portion with the coupling structure projects into the free internal diameter or wherein the neutral rim is radially inwardly delimited by the free internal diameter.

5. The freewheeling mechanism according to claim 1, wherein the base body is made in one piece from a common piece of material or forms a common piece of material.

6. The freewheeling mechanism according to claim 1, wherein the base body is designed as a formed part.

7. A freewheeling mechanism comprising:
a freewheeling member designed as an inner part and comprising a clamping structure;
a plurality of clamping parts arranged on the clamping structure; and
a sheet metal cage for spacing the clamping parts in a direction of revolution, the sheet metal cage placed on the freewheeling member and comprising:
a base body comprising a support portion extending radially outward; and
a coupling rim on a first axial side, the coupling rim comprising a coupling disk fixed coaxially on the base body and adjoining the support portion such that the coupling rim has a double material thickness, the coupling disk comprising a coupling portion with a coupling structure formed on a coupling portion inner circumference for interlocking coupling to the clamping structure such that the sheet metal cage is held on the freewheeling member for conjoint rotation in the direction of revolution, wherein:
the support portion and the coupling disk have a same external diameter with assembly recesses designed as passages open at an outer edge provided at their respective outer circumferences, the assembly recesses lying over one another in an assembled state; and the sheet metal cage is pushed on the freewheeling member such that:
the coupling structure engaged in an interlocking manner in the clamping structure in the direction of revolution; and
a neutral rim inner circumference rests in contact with the clamping structure.

8. The freewheeling mechanism of claim 7, wherein the base body is:
made in one piece from a common piece of material; or
forms a common piece of material.

9. The freewheeling mechanism of claim 7 wherein the base body is designed as a formed part.

\* \* \* \* \*